United States Patent Office 2,897,212
Patented July 28, 1959

2,897,212

3-HYDROXY-11-KETO-BISNORALLOCHOLENIC ACID AND THE ESTERS THEREOF

Earl M. Chamberlin, Westfield, and John M. Chemerda, Metuchen, N.J., assignors to Merck & Co., Inc., Rahway, N.J., a corporation of New Jersey No Drawing. Original application September 20, 1951, Serial No. 247,563, now Patent No. 2,854,451, dated September 30, 1958. Divided and this application November 29, 1957, Serial No. 704,222

5 Claims. (Cl. 260—397.1)

This application is a division of copending applications Serial No. 215,026, filed March 10, 1951, now abandoned, and Serial No. 247,563, filed September 20, 1951, now Patent No. 2,854,451.

This invention is concerned with novel chemical compounds of the cyclopentanopolyhydrophenanthrene series and processes for preparing the same; more particularly, it relates to novel cyclopentanopolyhydrophenanthrene compounds having functional substituents in ring C; and specifically it relates to new compounds having a hydroxy or keto substituent at the 11 position, and to processes for the preparation of such compounds.

Compounds of the adrenal cortex, such as Kendall's Compound E (cortisone), have been found to be of great value in the treatment of various diseases. Further, it is likely that Kendall's Compound E and/or other closely related 11-hydroxy steroids will find increasing therapeutic use in the future. Unfortunately, the only method for the preparation of such compounds presently available utilizes desoxycholic or cholic acids as the starting material. Cholic and desoxycholic acids have hydroxy substituents in ring C at the 12-position, thus providing a means for introducing a functional substituent at the 11 position. However cholic and desoxycholic acids, which are obtained from animal bile, are only available in limited amounts. Heretofore no practical method was available whereby a functional group could be introduced in ring C which would permit the use of more abundant steroids such as the sterols, ergosterol, cholesterol, stigmasterol, or plant sapogenins, such as diosgenin, tigogenin, and the like.

It is an object of the present invention to provide a process for introducing a functional group in ring C at the 11 position. It is a further object to provide a process for converting cyclopentanopolyhydrophenanthrene compounds having a double bond in the 7:8 position to the corresponding cyclopentanopolyhydrophenanthrene compound having a hydroxyl or keto group at positions 7 and 11. Another object is to provide new compounds of the steroid series having functional groups in ring C suitable for the preparation of other cyclopentanopolyhydrophenanthrene compounds. Other objects will be apparent from the detailed description hereinafter provided.

In accordance with our invention, we have now found that compounds of the cyclopentanopolyhydrophenanthrene series having an 11-keto substituent can be synthesized by reactions indicated as follows:

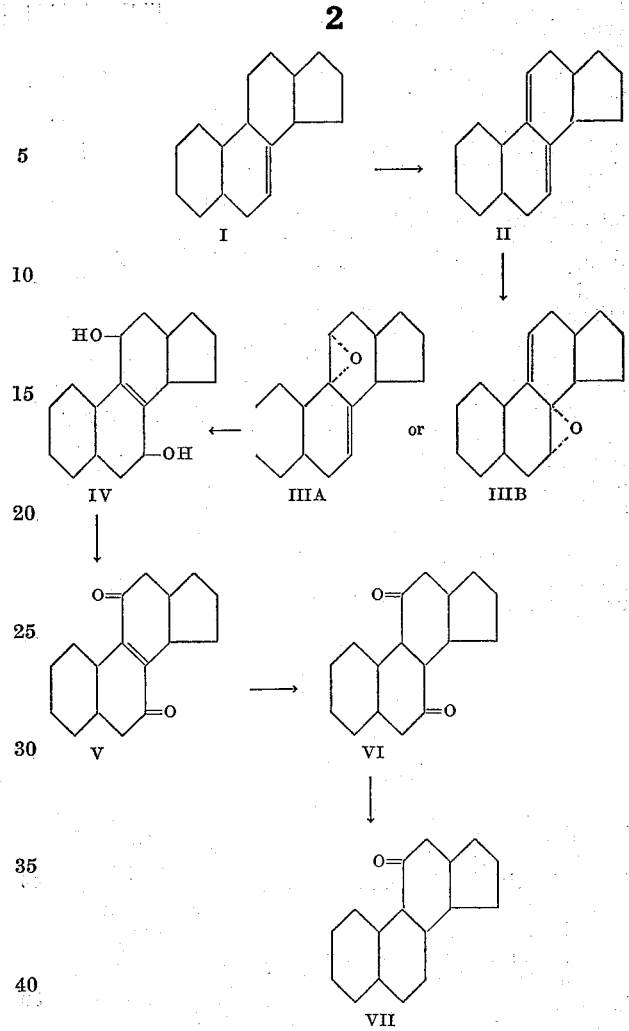

These reactions are carried out as follows:

A cyclopentanopolyhydrophenanthrene compound having a 7:8 double bond (I) is reacted with mercuric acetate producing the corresponding compound having conjugated double bonds in the 7:8 and 9:11 positions (II) which is treated with a per acid, thus forming an epoxide represented by the alternate Formulas IIIA and IIIB. (At present the exact structure of the epoxide is not known and it is represented by the alternative forms IIIA and IIIB. Alternatively it is possible that the product obtained is a mixture of these two forms.) This epoxide is then treated with an adsorbent to form the corresponding $\Delta^8$-7,11-dihydroxy compound (IV).

The $\Delta^8$-7,11-dihydroxy compound (IV) is reacted with an oxidizing agent to convert the hydroxy substituents to keto groups, thus obtaining the corresponding $\Delta^8$-7,11-diketo cyclopentanopolyhydrophenanthrene derivatives (V). These diketo compounds are then reduced to saturate the $\Delta^8$ double bond and form the corresponding 7,11-diketo compound (VI). The saturated diketo compound is then reduced to eliminate the 7-keto substituent, thus producing the corresponding 11-keto compound (VII). The latter compounds are useful intermediates for the preparation of 11-keto compounds having desirable thereapeutic properties.

The $\Delta^{7,9(11)}$-compounds of the cyclopentanopolyhydrophenanthrene series are conveniently prepared by reacting the corresponding $\Delta^7$-compound with mercuric acetate. We have found that this reaction is preferably effected by reacting the $\Delta^7$-compound with mercuric acetate and glacial acetic acid in the presence of a suitable solvent medium such as chloroform. The reaction is conveniently conducted by stirring the reaction mixture for 16–24 hours. After the reaction is completed, the $\Delta^{7,9(11)}$-compound is recovered from the reaction mixture by removing the precipitated mercurous acetate, and concentrating the solution under diminished pressure. If desired, the residue may be further purified by crystallization from suitable solvents. Thus, this process can be utilized to prepare $\Delta^{7,9(11)}$-pregnadiene-3-ol-20-one-3-acetate, and $\Delta^{7,9(11)}$-dehydrotigogenin acetate from $\Delta^7$-pregnenolone acetate and $\Delta^7$-dehydrotigogenin acetate respectively. Alternatively, other acyl derivatives of these starting materials or the 3-hydroxy compounds may be utilized as starting materials in our process to prepare the corresponding $\Delta^{7,9(11)}$-compounds.

Further, the 3-hydroxy-$\Delta^{7,9(11)}$-choladienic acid, which is also useful as a starting material in the processes of our invention, is readily obtained by reducing 3-hydroxy-12-keto-$\Delta^{7,9(11)}$-choladienic acid. This is conveniently accomplished by reacting the keto acid with hydrazine hydrate and an alkali metal hydroxide in the presence of a suitable high boiling solvent such as diethylene glycol.

This invention is concerned with compounds of the type represented by intermediate VII above, and with processes of producing the same. Compound VII may be represented by the following formula:

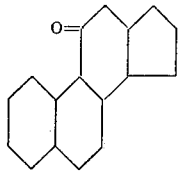

The starting materials used in the process of this invention, namely, the 7,11-diketo compounds shown by Formula VI, may be obtained as described in copending application, Serial No. 215,026, filled March 10, 1951.

Pursuant to our invention, we have found that the 7,11-diketo cyclopentanopolyhydrophenanthrene compounds can be reduced to the corresponding 11-keto compounds. We prefer to effect this reduction by reacting the 7,11-diketo compound with hydrazine hydrate and an alkali metal hydroxide at elevated temperatures in a high boiling solvent medium, for example, diethylene glycol. It is surprising that under these reaction conditions the 11-keto group is not simultaneously reduced along with the 7-keto group. On the contrary, we have found that under optimum conditions excellent yields of the desired 11-keto compounds are obtained by this reduction process.

Thus, in accordance with the processes described above 3-hydroxy-11-keto-$\Delta^{22}$-ergostene, 3-hydroxy-11-keto-bisnorallocholanic acid, 3-hydroxy-11-ketotigogenin, and the corresponding esters, acyl derivatives, or esterified acyl derivatives can be prepared from the corresponding 7,11-diketo compounds. If desired, these 3-hydroxy-11-keto compounds may be oxidized to obtain the 3,11-diketo compounds in accordance with methods known in the art.

The 11-keto cyclopentanopolyhydrophenanthrene compounds obtained by the processes of our invention can be used as starting maerials in the preparation of other steroid compounds such as Kendall's Compound E or Compound F.

The following examples are presented to illustrate specific embodiments of our invention.

EXAMPLE 1

*Preparation of 3-hydroxy-11-keto-$\Delta^{22}$-ergostene from 3-acetoxy-7,11-diketo-$\Delta^{22}$-ergostene*

A mixture of 1 g. of 3-acetoxy-7,11-diketo-$\Delta^{22}$-ergostene, 5 cc. of diethylene glycol, 0.455 g. powdered potassium hydroxide and 0.5 cc. of 85% hydrazine hydrate was heated at a temperature of 132° C. for 1 hour. The temperature was then raised to 190–200° C. and the reaction mixture was held at this temperature for 2 hours. Water was allowed to distill off during this heating period.

Fifteen cubic centimeters of water were added to the cooled reaction mixture and then the dark brown suspension was acidified with hydrochloric acid and filtered. The brown product was dissolved in hot acetone, filtered and then treated with charcoal (Darco) and filtered. The solvent was evaporated in a stream of nitrogen and the residue dissolved in 25 cc. of benzene and chromatographed on 20 g. of acid washed alumina.

The column was developed with the following solvents:

Benzene
Ether
Methanol
Ethyl acetate
Chloroform
Acetone

The benzene fractions yield a brown amorphous solid. All other fractions were empty or gave brown tars.

The brown amorphous material was dissolved in 30 cc. of benzene and 10 cc. of petroleum ether added and the solution chromatographed on 20 g. of acid washed alumina. The chromatograph was developed with the following solvents:

Petroleum ether/benzene 1:3
Benzene
Ether
Methanol

From the ether fractions 150 mg. of crystalline 3-hydroxy-11-keto-$\Delta^{22}$-ergostene was obtained which on recrystallization from methanol melted at 173–174° C. $[\alpha]_D^{23} = +26.6$; $\alpha = 0.485$; $C = 0.91\%$ $CHCl_3$.

*Analysis.*—Calc. for $C_{28}H_{46}O_2$: C, 81.10; H, 11.17. Found: C, 81.72; H, 11.29.

3.175 grams of 3-hydroxy-11-keto-$\Delta^{22}$-ergostene was refluxed with 20 cc. of acetic anhydride for 1 hour. On cooling to room temperature the 3-acetoxy compound crystallized out. It was filtered and washed with a little cold methanol. Yield 2.685 g. M.P. 122–124° C. A small sample of 3-acetoxy-11-keto-$\Delta^{22}$-ergostene recrystallized from methanol melted at 129.5–131.5° C.

*Analysis.*—Calc. for $C_{30}H_{48}O_3$: C, 78.90; H, 10.59. Found: C, 78.95; H, 10.82.

EXAMPLE 2

*Degradation of 3-acetoxy-11-keto-$\Delta^{22}$-ergostene to methyl 3-acetoxy-11-ketobisnorallocholanate*

2.36 grams of 3-acetoxy-11-keto-$\Delta^{22}$-ergostene was dissolved in 75 cc. of chloroform and treated with ozone at 0° C. The reaction mixture was diluted with 100 cc. of glacial acetic acid and oxidized at room temperature with 1 g. of chromic acid dissolved in 1 cc. of water and 50 cc. of glacial acetic acid. Five cubic centimeters of methanol were added to destroy excess chromic acid and the solvent was removed in vacuo to almost dryness.

The residue in the flask was dissolved by shaking twice with a mixture of 100 cc. of benzene and 50 cc. of 5% sulfuric acid. The combined aqueous acid solution was extracted with an additional 50 cc. of benzene. The combined benzene extracts were washed with 50 cc. of water and dried over anhydrous magnesium sulfate. The benzene was removed in vacuo and the residue dissolved in 250 cc. of ether.

The ethereal solution was stirred with 5 g. of anhydrous sodium carbonate and 10 cc. of water for 45 minutes. The ether layer was removed by decantation and the aqueous layer washed twice by decantation with ether.

The aqueous layer was acidified with 50% sulfuric acid and the liberated acid 3-acetoxy-11-keto-bisnorallocholanic acid was extracted into ether and separated from the aqueous layer.

The ethereal solution of the acid was treated with an ethereal solution of diazomethane and the ether evaporated to small volume on the steam bath whereupon the methyl ester crystallized out. Yield 750 mg. Recrystallized from methanol the substance, methyl 3-acetoxy-11-ketobisnorallocholanate, melted at 191–194° C.

*Analysis.*—Calc. for $C_{25}H_{38}O_5$: C, 71.73; H, 8.91. Found: C, 71.89; H, 9.15.

EXAMPLE 3

*Preparation of methyl 3,11-diketobisnorallocholanate from 3-acetoxy-11-ketobisnorallocholanate*

750 mg. of methyl 3-acetoxy-11-ketobisnorallocholanate (prepared as shown in Example 2) was refluxed with 30 cc. of 5% potassium hydroxide for one half hour. Fifty cubic centimeters of water were added, the precipitated product was filtered and washed with water. The product, methyl 3-hydroxy-11-ketobisnorallocholanate, melted at 176–178.5° C.

The 3-hydroxy compound was dissolved in approximately 30 cc. of acetone and oxidized at room temperature by addition of 200 mg. of chromium trioxide in 5 cc. of 1 N sulfuric acid. The oxidizing agent was added dropwise with stirring over a period of one half hour. The reaction mixture was stirred an additional 10 minutes, 1 cc. of methanol was added and the precipitated chromium salts filtered off.

The acetone solution was diluted with approximately 100 cc. of water which precipitated the product. After cooling, the product was filtered off and washed with water. Recrystallized from acetone the substance, methyl 3,11-diketobisnorallocholanate, melted at 201–204° C. Mixed melting point with an authentic sample 201–204° C. Mixed melting point with the cisisomer 171–193° C. Yield 250 mg. 37% yield; $[\alpha]_D = +63$.

*Analysis.*—Calc. for $C_{23}H_{33}O_4$: C, 73.96; H, 8.90. Found: C, 74.18; H, 9.20.

EXAMPLE 4

*Methyl 3-hydroxy-11-keto-bisnorallocholanate*

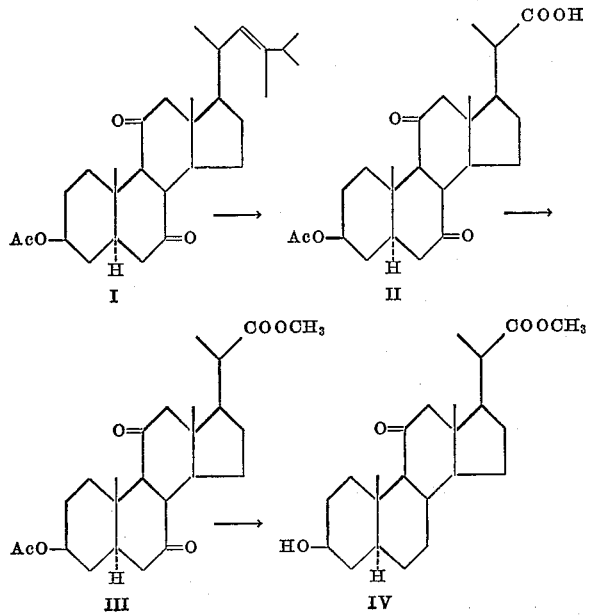

One gram of 3-acetoxy-7,11-diketo-$\Delta^{22}$-ergostene (I) obtained as described in copending application Serial No. 215,026, filed March 10, 1951, was dissolved in 100 cc. of chloroform and ozone was passed through at ice bath temperature until the approximate theoretical amount of ozone was absorbed. The reaction mixture was diluted with 100 cc. of glacial acetic acid, cooled to 5° C. and oxidized with 0.5 g. chromic acid dissolved in 0.75 cc. water and 50 cc. glacial acetic acid.

After standing overnight, 5 cc. of methanol was added and the solvent was removed in vacuo to practically dryness. The residue in the flask was dissolved by shaking twice with a mixture of 25 cc. of 5% sulfuric acid and 50 cc. of benzene. The combined benzene solutions were dried over anhydrous magnesium sulfate, and the benzene was evaporated on the steam bath in a stream of nitrogen.

The residue was dissolved in 200 cc. of ether and stirred with 5 g. of sodium carbonate and 2 cc. of water for 21 hours. The sodium salt of 3-acetoxy-7,11-diketo-bisnorallocholanic acid (II) was filtered off and dried in a vacuum desiccator.

The dried sodium salt was suspended in 25 cc. of ether and 25 cc. of 50% sulfuric acid was added in small portions until the mixture was definitely acid. 100 cc. of ether was added to bring about complete solution of all solids. The aqueous layer was separated and extracted once with 50 cc. of ether.

The combined ethereal solutions were dried over anhydrous magnesium sulfate and then evaporated on the steam bath to a small volume, whereupon 3-acetoxy-7,11-diketo-bisnorallocholanic acid (II) crystallized out. The product was recrystallized from ether; M.P. 235–238° C. $[\alpha]_D^{23} = 24.6$; $\alpha = 0.68$; C=1.38% $CHCl_3$.

*Analysis.*—Calc'd for $C_{24}H_{34}O_6$: C, 68.87; H, 8.19. Found: C, 68.67; H, 8.04.

125 mg. of 3-acetoxy-7,11-diketo-bisnorallocholanic acid was suspended in 25 cc. of ether and esterified with diazomethane. All solid dissolved and on evaporation of the ether to a small volume, the methyl ester (III) crystallized. M.P. 226.5–229° C. Mixed melting point with an authentic sample of the ester: 227–230° C.

5 g. of methyl 3-acetoxy-7,11-diketo-bisnorallocholanate (III) and 2.07 g. of powdered potassium hydroxide were placed in a 50 cc. round-bottom flask. 25 cc. of diethylene glycol and 2.3 cc. of 85% hydrazine hydrate were added and the temperature raised to 130–140° C. and held for 1 hour. The temperature was then raised to 195–200° C. and held for 2 hours.

After cooling, the reaction mixture was dissolved in benzene and water, 50% sulfuric acid added until an acid reaction was obtained. The benzene layer was separated, and the aqueous layer extracted three times with 50 cc. of benzene. The combined benzene solutions were washed with water and dried over anhydrous magnesium sulfate.

The benzene was treated with Darco. The benzene solution was concentrated in vacuo to dryness, the residue was dissolved in ether and esterified with an ethereal solution of diazomethane. The ether was evaporated, and the methyl 3-hydroxy-11-keto bisnorallocholanate (IV) was recrystallized from methanol, M.P. 177.5–180.5°. Mixed M.P. with an authentic sample, 177–179° C. $[\alpha]_D^{23} = +41$.

EXAMPLE 5

*Preparation of 3-hydroxy-11-ketobisnorallocholanic acid and its methyl ester from 3-acetoxy-7,11-diketobisnorallocholanic acid*

Two grams of 3-acetoxy-7,11-diketobisnorallocholanic acid (prepared as described in Example 4) were stirred in a 50 cc. round bottom flask with 15 cc. for diethylene glycol, 1.5 g. of powdered potassium hydroxide and 1.5 cc. of 85% hydrazine hydrate and the temperature raised slowly to 135–140° C. and held for 45 minutes. The temperature was then raised to 190–195° C. and held for one hour.

After cooling the reaction mixture was acidified with 2 N sulfuric acid, diluted with 30 cc. of distilled water and filtered. The tan, dried cake weighted 1.57 g. The product was dissolved in benzene-ethanol, treated with Darco, filtered through Supercel and the filtrate was concentrated until crystallization started. Recrystallization from benzene gave 0.60 g. of product melting at 258 to 261.4° C.

Analysis.—Calc. for $C_{22}H_{34}O_4$: C, 72.89; H, 9.45. Found: C, 72.82; H, 9.34.

An additional 0.60 g. of lower melting acid (M.P. 252–258) was recovered from the mother liquors of the above product.

A sample of the acid was esterified with diazomethane in ethereal solution to give methyl 3-hydroxy-11-keto bisnorallocholanate (III) melting point 175–177.5°, $[\alpha]_D^{23°}$ +42.3. The melting point of a mixture of this compound with an authentic sample was 175–178°.

EXAMPLE 6

*Preparation of 11-ketotigogenin from 3-acetoxy-7,11-diketotigogenin*

A mixture of 0.42 g. of 3-acetoxy-7,11-diketotigogenin, 2.1 ml. of diethylene glycol, 0.20 g. of powdered potassium hydroxide, and 0.21 ml. of hydrazine hydrate (85%) was stirred while being heated in an oil bath. The temperature was raised to 120–30° C. and held there for fifteen minutes. The temperature was then raised to 195–200° C. for 45 minutes. After cooling, the mixture was poured into 25 ml. of ice water mixture and the resulting mixture was neutralized with dilute sulfuric acid. The solid product was removed by filtration and was washed well with water. The dried crude product was dissolved in 20 ml. of methanol, and boiled for five minutes with a small amount of activated charcoal. After removing the charcoal by filtration, the methanol solution was concentrated to ten ml. Water was added to the hot solution until crystallization was incipient. Upon cooling, 0.22 g. of 11-ketotigogenin in the form of needles were obtained, M.P. 220–226° C. Recrystallized from a mixture of ethyl acetate-petroleum ether, the product melted at 222–226° C.

Analysis.—Calc'd. for $C_{27}H_{42}O_4$: C, 75.31; H, 9.83. Found: C, 75.40; H, 10.20.

11-ketotigogenin acetate was made by refluxing 11-ketotigogenin with acetic anhydride. Recrystallized from methanol, it melted at 224–229° C.

Various changes and modifications may be made in carrying out the present invention without departing from the spirit and scope thereof. Insofar as these changes and modifications are within the purview of the annexed claims, they are to be considered as part of our invention.

We claim:
1. A compound from the group consisting of 3-hydroxy-11-ketobisnorallocholanic acid, lower alkyl esters of 3-hydroxy-11-ketobisnorallocholanic acid and the 3-acyloxy derivatives thereof wherein the acyl substituent is a lower fatty acid radical.
2. Methyl 3-acetoxy-11-ketobisnorallocholanate.
3. Methyl 3-hydroxy-11-ketobisnorallocholanate.
4. 3-acetoxy-11-ketobisnorallocholanic acid.
5. 3-hydroxy-11-ketobisnorallocholanic acid.

References Cited in the file of this patent

UNITED STATES PATENTS

| | | |
|---|---|---|
| 2,492,188 | Sarett | Dec. 27, 1949 |
| 2,623,055 | Rust | Dec. 23, 1952 |